Patented Jan. 6, 1948

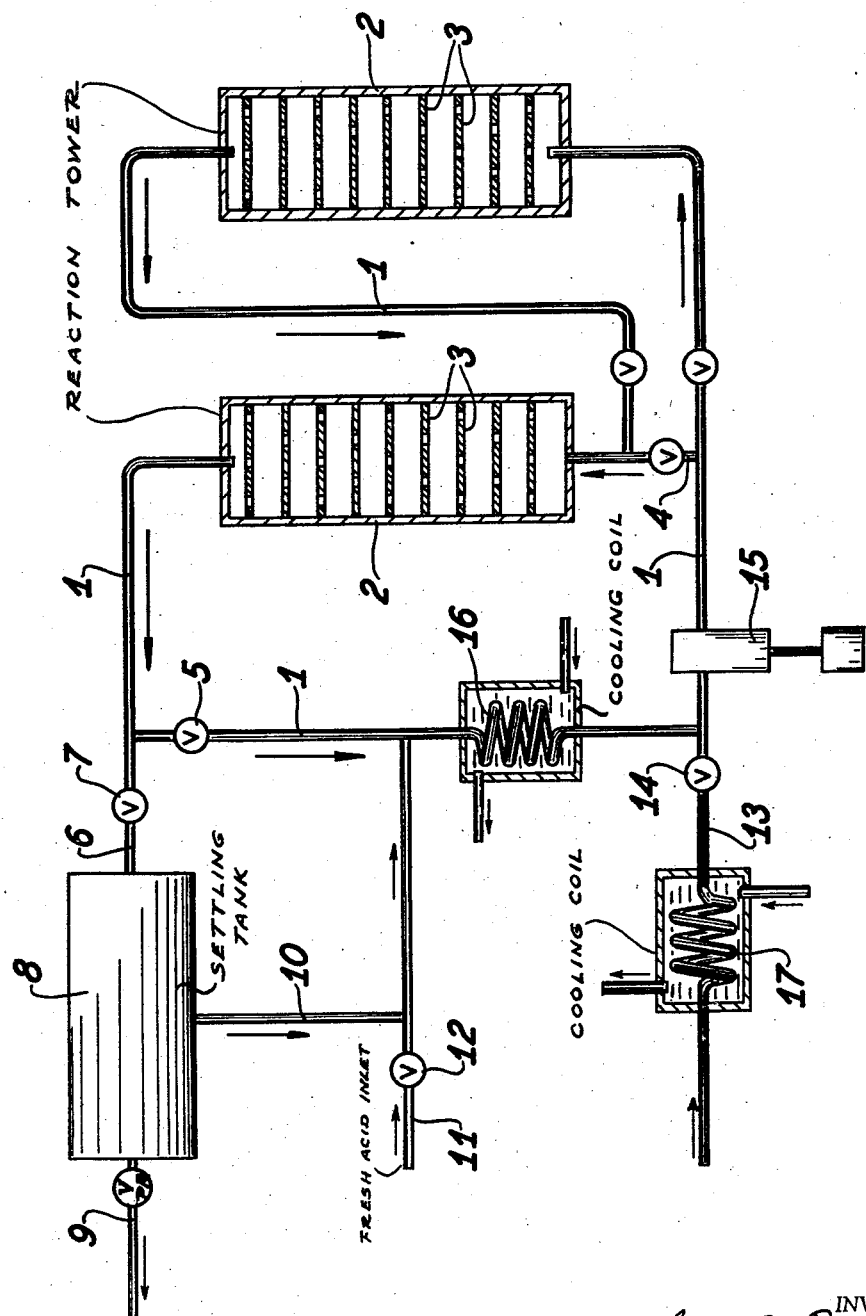

2,433,944

UNITED STATES PATENT OFFICE 2,433,944

METHOD FOR CONTINUOUSLY REACTING SATURATED TERTIARY HYDROCARBONS AND OLEFINES

Arthur A. Draeger and Charles T. Shewell, Baytown, Tex., assignors to Standard Oil Development Company, a corporation of Delaware Application November 5, 1938, Serial No. 238,966

1 Claim. (Cl. 260—683.4)

The present invention is directed to a continuous method for the production of saturated hydrocarbons by the reaction between saturated hydrocarbons containing tertiary carbon atoms and olefines.

It has already been proposed to take advantage of the reaction between olefines and saturated hydrocarbons such as paraffines and naphthenes, which contain tertiary carbon atoms and which will hereinafter be referred to as tertiary hydrocarbons or, more specifically, tertiary paraffins to produce higher hydrocarbons of a saturated nature by causing the initial materials to react in the presence of a mineral acid catalyst, such as sulphuric acid or orthophosphoric acid. The specific embodiment of this general reaction which is of greatest interest at the present time is the reaction between isobutane and olefines to form hydrocarbons boiling within the gasoline range containing a considerable amount of isooctane and fractions suitable for aviation gasoline. The following discussion, for ease of exposition, will be directed to this specific embodiment with the understanding that all references to isobutane are to be considered applicable to tertiary hydrocarbons in general.

The reaction between isobutane and olefines has hitherto been carried out on a batch basis. Briefly, the previous practice has been to fill a reaction chamber with the mineral acid, for example, sulphuric acid, having a strength of about 96%, in which isobutane has been dissolved or dispersed. This reaction chamber was provided with a stirrer and was surrounded by a jacket in which was a cooling medium adapted to maintain the reaction temperature below about 30° C. The olefines, preferably composed largely of isobutylene, were then fed into the reaction chamber gradually with constant stirring. Gradual addition of the olefines was dictated by the necessity for avoiding the excessive generation of heat in the reaction chamber. Stirring served the purpose of preventing stratification, and of assisting in the dissipation of the heat of reaction. The olefines were generally added in an amount which was equimolecular with respect to the amount of isobutane in the reaction chamber. It has been suggested that the isobutane may be employed in amounts greater than equimolecular amounts. Specifically, molecular proportions of isobutane to isobutylene as high as four to one have been suggested.

A batch operation of this type is attended with many inherent difficulties. To begin with, the reaction is slow, and, if it is to be carried out on a commercial basis, very large reaction vessels must be employed. The greater the size of the reaction vessel, however, the more acute become the problems of agitation and temperature control. Furthermore, this procedure affords no opportunity to the operator for conducting the operation with uniform proportions of reaction materials. For example, the ratio of tertiary hydrocarbons to olefines in the reaction chamber, and the ratio of acid to olefines in the reaction chamber, vary from the beginning to the end of the process. These ratios are not subject to the control of the operator and cannot be varied by him to influence the character of the product.

Another difficulty with the batch operation is that the operator has no way of knowing what is the proportion of tertiary hydrocarbons to olefines at the point of introduction of the latter to the reaction mass. Accordingly, he is unable to control this factor so as to influence the character of the final product.

It is a recognized fact that it is desirable to have an excess of iso-paraffine to olefine. In converting the batch method to a continuous operation, it was found when an attempt was made to secure the desired ratio of tertiary paraffines to olefines by properly proportioning the feed stock that the process became undesirably expensive because of the necessity of eliminating unreacted paraffines from the final product. According to the present invention this difficulty has been overcome by establishing a circulating stream of emulsion of the tertiary paraffine and sulphuric acid and providing for the desired ratio of tertiary paraffines to olefines at the point of introduction of the latter into the reaction mass by continuously recycling the paraffines whereby a large ratio of tertiary paraffines to olefines is attainable with only a relatively small ratio of tertiary paraffines to olefines in the fresh feed stock. This expedient has resulted in a very considerable reduction of the amount of low boiling tertiary paraffines which must be removed from the final product, and thereby has greatly cheapened the process.

In order to obtain a product which contains satisfactory amounts of isooctane and/or aviation gasoline, while maintaining high yields, it has been found necessary to observe certain factors carefully. The most important of these factors is the maintenance of a minimum ratio of tertiary paraffines to olefines at the point of introduction of the latter into the reaction mass. It has been found that when this ratio is below 30:1 the product obtained is deficient in octane fractions to an undesirable degree. Preferably, this ratio is maintained in the neighborhood of 100:1 to 200:1. The desired ratio is obtained by properly proportioning the recycle stock to the fresh feed, the recycle stock being composed of acid and hydrocarbons. Suitable tertiary paraffine to olefine ratios can be maintained by maintaining the ratio of recycle stock to fresh feed in excess of about 15:1. Preferably, this ratio should be between 35:1 and 65:1.

The ratio of tertiary paraffines to olefines at the point of introduction of the latter, depends also upon the ratio of these materials in the fresh feed. It has been observed that the lower this ratio in the fresh feed the higher must be the total ratio of tertiary hydrocarbons to olefines at the point of introduction of the feed in order to produce a satisfactory product. This relation is by no means linear, but, on the contrary, is exponential. In general, suitable tertiary paraffine to olefine ratios at the point of introduction of the fresh feed can be obtained, with the recycle stock to fresh feed ratio as indicated above, by maintaining a ratio of tertiary hydrocarbons to olefines in the fresh feed of at least 4:1. Experience has shown that very good yields of isooctane can be obtained in this emulsion type of operation with a ratio in the fresh feed of tertiary paraffines to olefines of 8:1, and a total ratio of these reactants, at the point of introduction of the fresh feed, in excess of 80:1.

A second factor which must be considered is the overall ratio of acid to hydrocarbons in the circulating system. It has been found that within certain limits this ratio can be varied without having a very substantial effect upon the yield of product or the nature of the product. In general, this ratio is satisfactory when maintained between 1:3 and 3:1.

In the next place, it has been found that there must be a certain minimum ratio of acid to olefines at the point of introduction of the latter. This ratio is established by the volume of acid passing the point of feed introduction over a certain period by the volume of olefines introduced in that period. For a successful operation this ratio should be at least 50:1. Preferably, for maximum octane yields, this ratio should be in excess of 150:1. Ratios in the neighborhood of 300:1 have been found to yield excellent results.

In general, then, it may be stated that the process of the present invention is carried out by establishing a circulating stream of an emulsion of isobutane in sulphuric acid which may have an initial strength of 96–100%, but which, when the system is in operation, may be maintained at a concentration of 90–95%, maintaining a substantial portion of the stream at a temperature ranging from about 60° F. to 175° F., this portion being termed the reaction zone, introducing into the stream ahead of the reaction zone, a mixture of isobutane and olefine which should contain at least four parts (by volume) of the former to one part (by volume) of the latter, separating a small portion of the emulsion from the main body of the stream behind the reaction zone, allowing this small portion to settle into a lower layer of sulphuric and an upper layer of hydrocarbons, discharging the latter from the system and returning the former to the stream, while maintaining a ratio of recycle stock to fresh feed of at least 15:1, by volume, a tertiary hydrocarbon to olefine ratio at the point of introduction of the fresh feed of at least 30:1, by volume, and an acid to olefine ratio, at the same point, of at least 50:1, by volume, and regulating the length and/or the velocity of the stream so as to provide a contact time under reaction conditions of from about thirty minutes to one hundred and twenty minutes. The system is operated at a pressure sufficient to maintain reactants in liquid state.

In practicing the process of the present invention it is preferred to use the reactants in as pure a state as possible. Refinery operations, however, do not yield any large supply of pure $C_4$ olefines. The most abundant source of these olefines is the $C_4$ cut from cracking operations. This fraction contains a considerable amount of normal butane, the boiling point of which is so close to that of the butenes that separation of the two is practically impossible.

If these refinery gases were used in a continuous process in which the desired proportions of tertiary paraffines to olefines are obtained by properly proportioning the feed stock, the result would be the necessity of continuously separating isobutane from butane in the final product since it is naturally desirable to recycle the isobutane. This difficulty is overcome to a large extent by the procedure of the present invention, since, by retaining most of the hydrocarbons fed into the system in the circulating system, and thereby reducing the ratio of tertiary paraffine to olefine required in the fresh feed, the overall amount of required separation of iso-butane from normal butane is greatly reduced.

It is to be understood, of course, that olefines from other sources can be utilized. For example, butene polymers or copolymers of butene and isobutene may be employed. Likewise, the use of propylene and amylene is contemplated, either alone or in admixture with each other or with butenes. Also, it may be mentioned that other isoparaffins, such as isopentane and isohexane, can be used in addition to or instead of isobutane.

The method of the present invention may be better understood from the following detailed description of the accompanying drawing in the single figure of which is shown schematically a front elevation of a plant suitable for the production of gasoline from isobutane and butylene according to the present invention.

Referring to the drawing, numeral 1 designates a pipe which may be considered a closed circulatory system in which is arranged a pair of towers 2, each of which is provided with perforated plates 3 which serve to effect a thorough mixing of the acid and hydrocarbons. A by-pass 4 is arranged between the two towers so that, if desired, the mixture may only be passed through one tower in the event that this is sufficient to provide the proper time of contact. It is to be understood, of course, that the number of towers may be increased in order to provide proper time of contact.

At a point behind the reaction towers 2, line 1 is provided with a valve 5 ahead of which is a branch line 6 provided with a valve 7. Line 6 leads to a settling tank 8 which is provided at its upper end with a draw-off line 9 for hydrocarbon products, and at its lower end with a draw-off line 10 for acid. The hydrocarbon products withdrawn are treated in the usual manner, that is, washed with caustic to complete neutralization, stabilized and fractionated.

Line 10 returns to line 1, and is provided with a branch line 11 controlled by a valve 12 which is utilized for the introduction of fresh acid or make-up acid into the system. Behind return line 10, in line 1, is a line 13 provided with a valve 14 for the introduction of hydrocarbons into the feed stock. At a point adjacent the point of introduction of hydrocarbon feed stock is arranged a pump 15 for keeping the stream of acid in circulation.

Line 1 is provided with a cooling coil 16, and line 13 is provided with a cooling coil 17 for the purpose hereinafter specified.

In placing the aforedescribed system in operation the system is first filled with iso-butane. Sulphuric acid of a strength of between about 96% and 100% is then continuously added with the concurrent withdrawal of hydrocarbons until the desired amount of sulphuric acid is contained in the system. The reverse procedure may also be used, or a preformed mixture of sulphuric acid and iso-butane may be used to fill the system. The resulting mixture of sulphuric acid and iso-butane is circulated and the addition of fresh acid through line 11 is begun. Concurrently with the addition of fresh feed, hydrocarbons are withdrawn from the system through line 9 in an amount sufficient to balance the amount of hydrocarbons fed in.

In order to control the temperature of the circulating stream, suitable cooling of the emulsion and of the fresh feed is effected in cooling coils 16 and 17. It is to be understood that it is not necessary to keep the whole stream at reaction temperature, it being sufficient that a substantial portion thereof be so maintained.

It is desirable that the velocity of the reaction stream be kept fairly high so as to induce turbulence into it. In this way the hydrocarbons and acid are maintained in reasonably homogeneous mixture and better control of the reaction is provided. In other words it is preferable that there be no substantially stagnant portions of the stream. As an example of a stream velocity suitable for good operation it may be stated that when pipe 1 has an internal diameter of one-half inch, the rate of movement of the stream therein past the point of introduction of fresh feed should be between about one hundred and three hundred and fifty liters per hour.

For the first few hours of operation the hydrocarbons withdrawn will contain only a relatively small amount of the desired product. After the system has been on stream a sufficient length of time to reach equilibrium, say from three to six hours, the product withdrawn becomes fairly uniform and contains a large amount of the desired fractions, so long as the conditions heretofore enumerated are observed. It will be understood that from time to time it is necessary to add fresh make-up acid through line 11. Ordinarily make-up acid is not required so long as the acid in the system, which is reckoned both as free acid and combined acid, retains a strength in excess of 90%.

By way of illustration, only, the following tables give the results of a run conducted under the preferred operating conditions according to the present invention. In this run the operating conditions and the yield are set forth. It may be mentioned that the olefine employed was a refinery C4 cut containing 10.4% of isobutene and 20.4% of normal butene. In the following table, parts are by volume:

| Hours of Operation | 7–24 | 25–48 | 49–72 | 73–96 |
|---|---|---|---|---|
| Make-Up Acid, Vol. Per Cent on Fresh Feed | 2.7 | 3.3 | 3.3 | ------ |
| Used Acid: | | | | |
| Titratable Acidity_____per cent__ | 96.3 | 95.8 | 95.7 | 95.5 |
| Water_____do____ | 3.3 | 3.4 | 3.6 | 3.6 |
| Effective Strength_____do____ | 96.6 | 96.6 | 96.5 | 96.4 |
| Average Reactor Temperature _° F__ | 67 | 68 | 68 | 67 |
| Time of Contact_____Minutes__ | 86 | 92 | 95 | 88 |
| Isobutane-Butene ratio in fresh feed___ | ------ | ------ | 8:1 | ------ |
| Recycle Ratio (Vol. Acid-Oil Mixture per Vol. Fresh Feed)_____ | 51:1 | 50:1 | 54:1 | 53:1 |
| Acid-Oil Ratio (at point of feed inlet)_ | 51:49 | 51:49 | 50:50 | 53:47 |
| Acid-Butene Ratio (at point of feed inlet)_____ | ------ | ------ | 306:1 | ------ |
| Isobutane-Butene Ratio (at point of feed inlet)_____ | ------ | ------ | 187:1 | ------ |
| Product Yield, Per Cent on Butenes__ | 159 | 173 | 169 | 161 |
| Inspections of Product: | | | | |
| Gravity_____° A. P. I__ | 67.9 | 67.3 | 67.9 | 68.4 |
| I. B. P_____° F__ | 122 | 130 | ------ | ------ |
| F. B. P_____° F__ | 432 | 424 | ------ | ------ |
| 50% off at_____° F__ | 225 | 224 | ------ | ------ |
| Analysis of Product by Distillation: | | | | |
| Butane_____per cent__ | 1.1 | 1.3 | ------ | ------ |
| Light Fraction_____do____ | 12.2 | 9.4 | ------ | 9.9 |
| Octane Fraction_____do____ | 74.2 | 77.8 | ------ | 79.9 |
| Heavy Fraction_____do____ | 12.5 | 11.5 | ------ | 10.2 |
| Inspection of Octane Fraction: | | | | |
| Octane Number_____ | 93.5 | 93.9 | ------ | ------ |
| I. B. P_____° F__ | 207 | 206 | ------ | ------ |
| F. B. P_____° F__ | 254 | 254 | ------ | ------ |
| 50% off at_____° F__ | 223 | 223 | ------ | ------ |
| Gravity_____° A. P. I__ | 68.3 | 68.4 | ------ | ------ |
| Product Yield, Per Cent on Butenes (C4 Free): | | | | |
| Total Product_____ | 161 | 175 | 169 | 161 |
| Octane Fraction_____ | 121 | 138 | 135 | 129 |
| Composition of Butane Free Product: | | | | |
| Light Fraction_____per cent__ | 12.3 | 9.5 | ------ | 9.9 |
| Octane Fraction_____do____ | 75.1 | 78.8 | ------ | 79.9 |
| Heavy Fraction_____do____ | 12.6 | 11.7 | ------ | 10.2 |

The nature and objects of the present invention having been thus described and illustrated, what is claimed as new and useful and is desired to be secured by Letters Patent is:

In the continuous alkylation of isoparaffin hydrocarbons by reaction with olefin hydrocarbons in the presence of a liquid alkylation catalyst of greater density than the hydrocarbons undergoing treatment, the steps comprising continuously introducing feed hydrocarbons and catalyst to a vertical reaction vessel, continuously withdrawing from the upper portion of said vessel a stream of mixed catalyst and hydrocarbons including alkylated hydrocarbons, diverting at least a substantial portion of the withdrawn stream, recycling said diverted portion to the lower portion of said reaction vessel in such amount and under such velocity of flow as to impart substantial agitation to the fluid contents of said vessel, passing the non-diverted portion of said stream to a settling vessel, effecting separation in said vessel between alkylated hydrocarbons and catalyst, separately discharging the alkylated hydrocarbons and catalyst from the separating vessel, and recycling at least a portion of said discharged catalyst to the reaction vessel.

ARTHUR A. DRAEGER.
CHARLES T. SHEWELL.

REFERENCES CITED

The following references are of record in the file of this patent:

UNITED STATES PATENTS

| Number | Name | Date |
|---|---|---|
| 2,112,847 | Ipatieff et al. | Apr. 5, 1938 |

(Other references on following page)

| Number | Name | Date |
|---|---|---|
| 2,112,846 | Ipatieff et al. | Apr. 5, 1938 |
| 2,001,910 | Ipatieff | May 21, 1935 |
| 2,009,108 | Egloff | July 23, 1935 |
| 2,169,809 | Morrell | Aug. 15, 1939 |
| 2,211,747 | Goldsby et al. | Aug. 13, 1940 |

FOREIGN PATENTS

| Number | Country | Date |
|---|---|---|
| 479,345 | Great Britain | Jan. 31, 1938 |
| 824,329 | France | Nov. 10, 1937 |

OTHER REFERENCES

Trade-Mark, 376,688, April 2, 1940.